United States Patent

Shipley

Patent Number: 5,433,278
Date of Patent: Jul. 18, 1995

[54] EARTH CLOD CHOPPER

[76] Inventor: Jeffrey C. Shipley, Rte. 2, Box 259J, Solesberry, Ind. 47459

[21] Appl. No.: 130,860

[22] Filed: Oct. 4, 1993

[51] Int. Cl.⁶ .............................................. A01B 27/00
[52] U.S. Cl. .................................... 172/370; 172/372; 172/379; 172/766; 241/169.2; 403/4; 403/87
[58] Field of Search ............... 172/370, 371, 372, 378, 172/379, 380, 766, 19, 25; 241/168, 169.2; 403/90, 4, 87, 321, 104, 103, 108; 15/172, 144.1, 144.4; 16/110 R, DIG. 24; 294/57; D4/138; D8 DIG. 1, DIG. 7

[56] References Cited

U.S. PATENT DOCUMENTS

| | | | |
|---|---|---|---|
| D. 161,323 | 12/1950 | D'Harlingue | D08/DIG. 7 |
| 1,085,505 | 1/1914 | Stafford | 172/371 |
| 1,171,738 | 2/1916 | Mallet | 16/110 R |
| 1,191,810 | 7/1916 | Miller | 403/4 X |
| 1,350,652 | 8/1920 | Hughes | 403/4 X |
| 1,569,421 | 1/1926 | Coelho | 172/379 |
| 1,592,731 | 7/1926 | Francis | 172/766 X |
| 1,609,906 | 12/1926 | Buckley | 403/321 X |
| 1,662,500 | 3/1928 | Henneck | 294/57 X |
| 1,771,189 | 7/1930 | Palmer | 403/4 X |
| 1,843,755 | 2/1932 | Baker | 403/4 |
| 1,896,568 | 2/1933 | Ammons | 403/4 |
| 1,979,180 | 10/1934 | Trippeda | 403/4 X |
| 2,020,571 | 11/1935 | Pick | 172/379 X |
| 2,405,056 | 7/1946 | Rosenbloom | 241/168 X |
| 2,429,753 | 10/1947 | Grosch | 403/4 |
| 2,808,604 | 10/1957 | Elges | 15/144.1 X |
| 2,854,912 | 10/1958 | Best | 172/371 |
| 2,887,710 | 5/1959 | Mahoney | 15/172 |
| 3,153,252 | 10/1964 | Ricciardi | 15/144.4 |
| 3,225,837 | 12/1965 | Richards | 172/371 |
| 3,543,861 | 12/1970 | Takakita et al. | 172/66 |
| 3,544,173 | 12/1970 | Senick et al. | 403/321 X |
| 3,705,630 | 12/1972 | Vissers | 172/713 |
| 3,901,324 | 8/1975 | Fisher | 172/19 |
| 4,411,298 | 10/1983 | Ellingsen et al. | 403/87 X |
| 4,412,589 | 11/1983 | Francis | 172/148 |
| 4,819,735 | 4/1989 | Puckett | 172/22 |
| 4,836,604 | 6/1989 | Romano | 403/87 X |
| 4,989,295 | 2/1991 | Gühne et al. | 15/144.4 X |
| 5,327,610 | 7/1994 | Smith | 15/144.1 X |

FOREIGN PATENT DOCUMENTS

| | | | |
|---|---|---|---|
| 73344 | 10/1976 | Australia | 172/25 |
| 60693 | 7/1912 | Switzerland | 172/379 |
| 116336 | 6/1918 | United Kingdom | 172/766 |
| 2098442 | 11/1982 | United Kingdom | 172/379 |

*Primary Examiner*—Randolph A. Reese
*Assistant Examiner*—Christopher J. Novosad

[57] ABSTRACT

A clod chopper structure arranged to effect the cutting and cubing of earth clods into manageable agricultural components is provided. The chopper includes a rectilinear frame, including intersecting rows of first and second blade members whose edges extend beyond the lower periphery of the frame. The handle is arranged in a modified configuration for adjustment pivotally relative to the frame.

3 Claims, 4 Drawing Sheets

EARTH CLOD CHOPPER

BACKGROUND OF THE INVENTION

1. Field of the Invention

The field of invention relates to earth chopping structure, and more particularly pertains to a new and improved earth clod chopper wherein the same is arranged to effect the chopping of earth into manageable cubes.

2. Description of the Prior Art

Clod breaking structure of various types are utilized in the prior art such as exemplified by the U.S. Pat. Nos. 3,705,630; 4,412,589; and 3,543,861.

The instant invention attempts to overcome deficiencies of the prior art by providing for a readily manipulated earth chopping structure arranged for ease of use as well as effectiveness in construction and in this respect, the present invention substantially fulfills this need.

SUMMARY OF THE INVENTION

In view of the foregoing disadvantages inherent in the known types of earth chopping structure now present in the prior art, the present invention provides an earth clod chopper including a rectilinear frame fixedly mounting orthogonally intersecting rows of blade members to effect cubing of earth clods into manageable agricultural components. As such, the general purpose of the present invention, which will be described subsequently in greater detail, is to provide a new and improved earth clod chopper which has all the advantages of the prior art clod chopping apparatus and none of the disadvantages.

To attain this, the present invention provides a clod chopper structure arranged to effect the cutting and cubing of earth clods into manageable agricultural components. The chopper includes a rectilinear frame, including intersecting rows of first and second blade members whose edges extend beyond the lower periphery of the frame. The handle is arranged in a modified configuration for adjustment pivotally relative to the frame.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved earth clod chopper which has all the advantages of the prior art clod chopper apparatus and none of the disadvantages.

It is another object of the present invention to provide a new and improved earth clod chopper which may be easily and efficiently manufactured and marketed.

It is a further object of the present invention to provide a new and improved earth clod chopper which is of a durable and reliable construction.

An even further object of the present invention is to provide a new and improved earth clod chopper which is susceptible of a low cost of manufacture with regard to both materials and labor, and which accordingly is then susceptible of low prices of sale to the consuming public, thereby making such earth clod choppers economically available to the buying public.

Still yet another object of the present invention is to provide a new and improved earth clod chopper which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
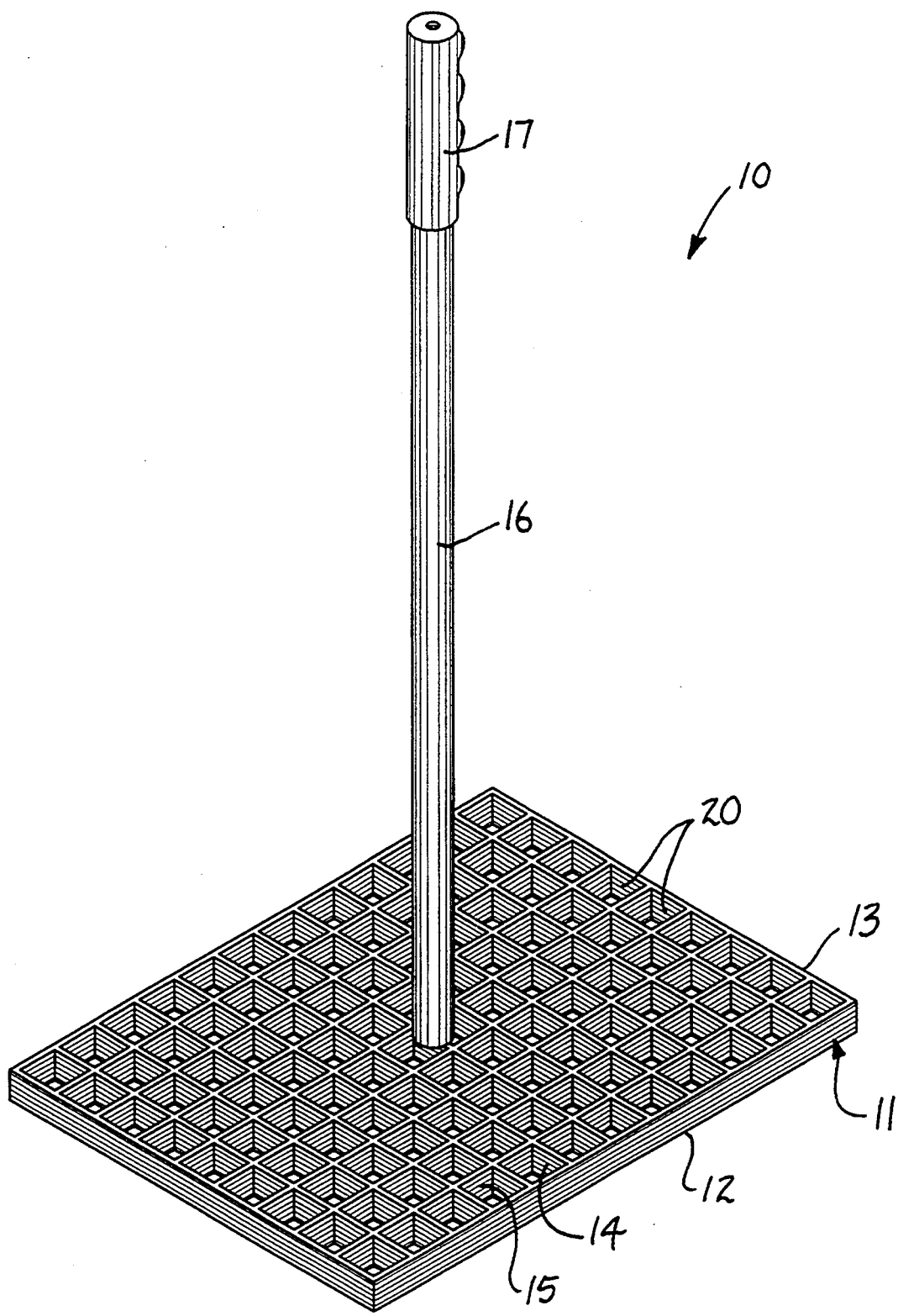
FIG. 1 is an isometric illustration of the invention.

With reference now to the drawings, and in particular to FIGS. 1 to 6 thereof, a new and improved earth clod chopper embodying the principles and concepts of the present invention and generally designated by the reference numerals 10 and 10a will be described.

Figure 2:
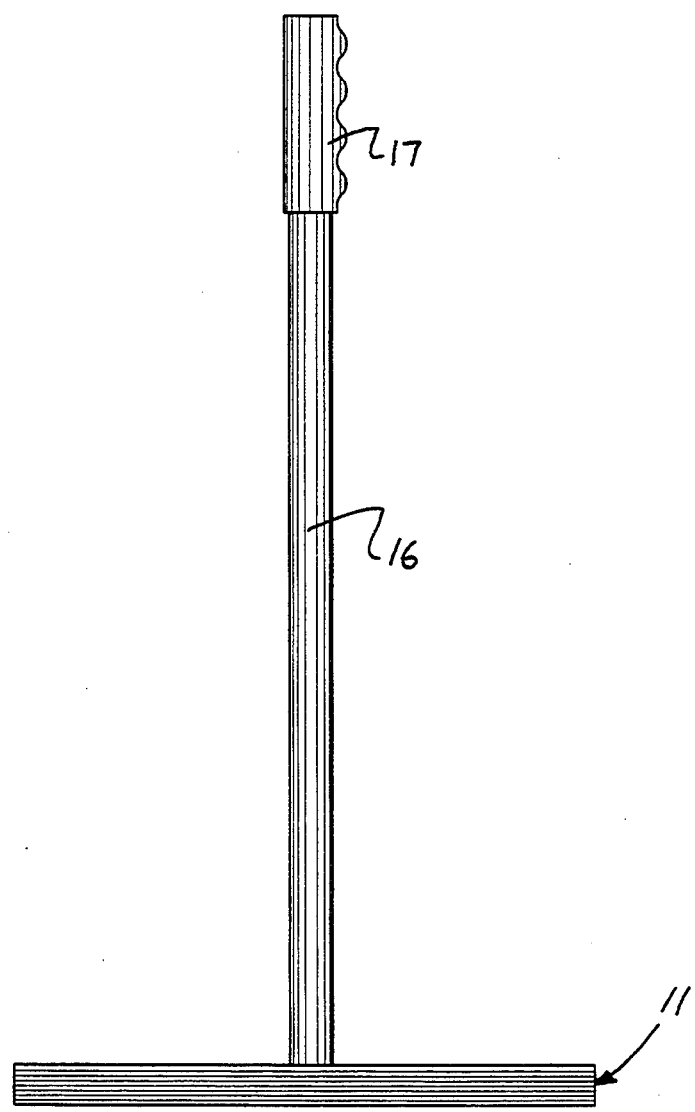
FIG. 2 is an orthographic side view of the invention.
Figure 3:
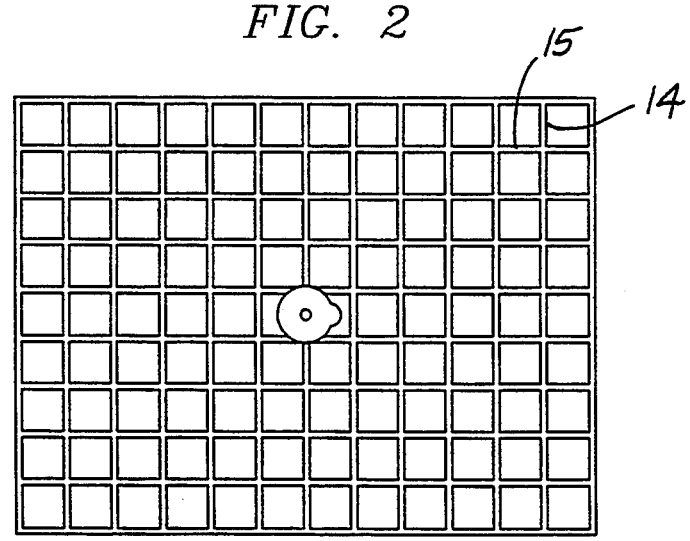
FIG. 3 is an orthographic top view of the invention.

More specifically, the earth clod chopper 10 of the instant invention, as indicated in the FIGS. 1-3, includes a rigid rectilinear frame 11 having a lower periphery 12 spaced from an upper periphery 13 that are typically in a parallel relationship to define a matrix of parallel cells 20. The cells are typically of a width and of a square cross-sectional configuration to define two .inch side walls to provide for forming agricultural clod cubes of manageable proportions. First parallel cutter blades 14 extend in a parallel relationship relative to one another within the frame extending from the lower periphery to the upper periphery, with second cutter blades 15 in a parallel array orthogonally intersecting the first cutter blades 14 defining the parallelepiped cells 20. The first cutter blades 14 are formed with first sawtooth blade edges 18, of a type as indicated in FIG. 4, with the second cutter blades 15 formed with second sawtooth cutter blade edges 19.

Figure 4:
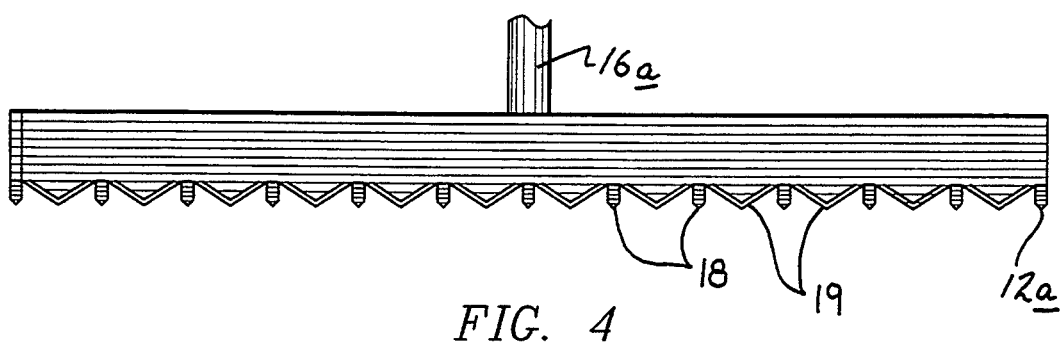
FIG. 4 is an enlarged orthographic view of the frame indicating the blade structure projecting beyond the frame.
Figure 5:
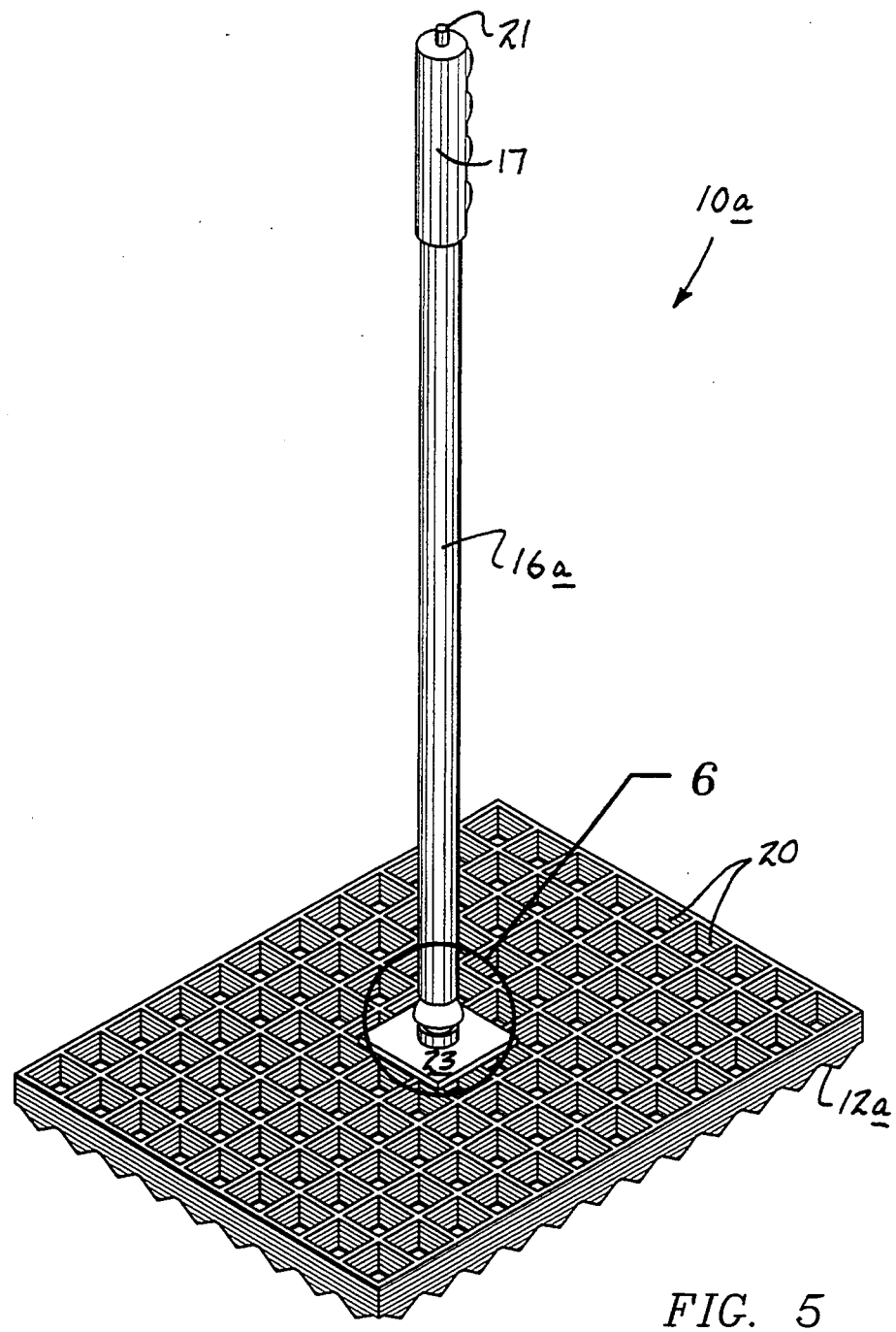
FIG. 5 is an isometric illustration of the modified earth clod chopper to include the organization as indicated in FIG. 4.

The organization 10a, as indicated in the FIG. 5 for example, employs a modified lower periphery 12a to define a sawtooth blade lower periphery, as illustrated in FIG. 4, to assist in the severing of earth clods (not shown) that are severed upon projecting of the frame 11 downwardly upon such clods. A support shaft 16 mounted medially and orthogonally relative to the frame and secured to the first and second cutter blades 14 and 15 medially of the frame provide ease of manual manipulation of the apparatus as illustrated, with the support shaft 16 terminating in a handle portion 17 at a remote distal end relative to the frame. To this end, the support shaft 16 has its first end mounted in adjacency to the frame, with its second end having the handle portion 17.

Figure 6:
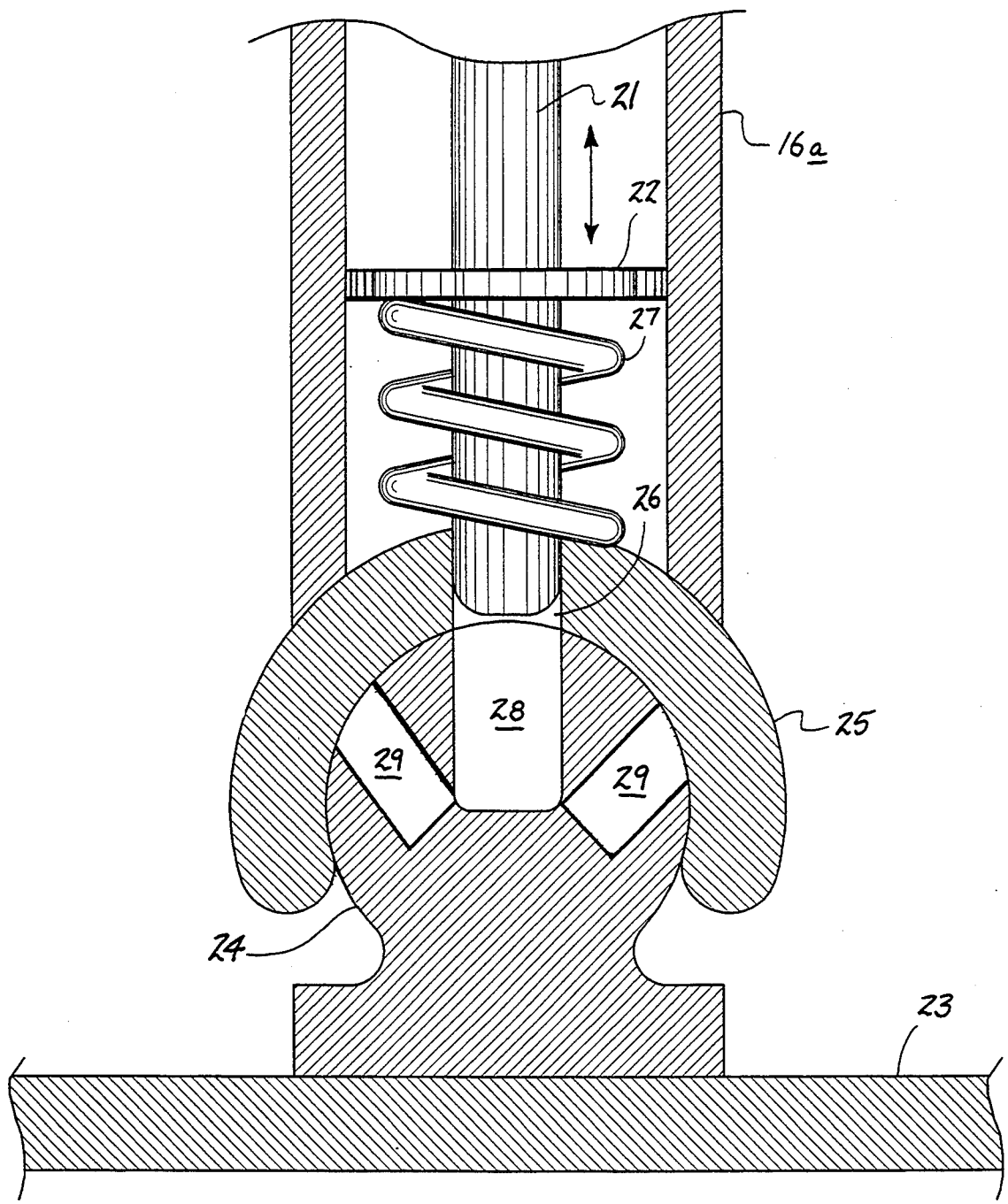
FIG. 6 is an enlarged orthographic cross-sectional illustration of section 6 as set forth in FIG. 5 to indicate the cooperative relationship of the support shaft to the frame.

The apparatus 10a, as indicated in FIGS. 4-6, in addition to the sawtooth blade structure, as illustrated in FIG. 4, includes a mounting plate 23 fixedly mounted to a plurality of the first and second cutter blades 14 and 15 coplanar with the upper periphery 13, with the mounting plate 23 orthogonally oriented relative to the first and second cutter blades 14 and 15. A semi-spherical head 24 (see FIG. 6) is orthogonally mounted meal tally of the mounting plate 23 and receives slidably thereon a semi-spherical cover 25 that is fixed to the first or lowermost end of the modified support shaft 16a. A plunger rod 21 (see FIG. 6) is reciprocatably and medially directed slidably through the modified support shaft 16a and is slidably received through an abutment plate 22, with a spring member 27 captured between the abutment plate 22 and the semi-spherical cover 25. In this manner, with the spring member 27 fixed to the plunger rod 21 in adjacency to the abutment plate, the plunger rod has its lowermost end arranged for reception within first or second receiving bores 28 and 29. The first receiving bore 28 is orthogonally oriented relative to the mounting plate and arranged medially of the semi-spherical head 24, with second bores 29 oriented at oblique angles relative to the first and second bore 28 to provide for angular orientation of the support shaft to permit the support shaft to be employed in an angular orientation relative to the rectilinear frame to provide for impacting of the frame onto an underlying earth clod if desired, and to provide for additional angular approach to an earth clod to enhance its severing into manageable cubes.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes wild readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by Letters Patent of the United States is as follows:

1. An earth clod chopper, comprising,
    a continuous rigid frame, with the frame having a lower periphery spaced from an upper periphery, and
    spaced first cutter blades arranged parallel relative to one another directed coextensively within the frame, and
    the first cutter blades mounted within the frame, and
    second cutter blades orthogonally intersecting the first cutter blades, wherein the second cutter blades are arranged parallel relative to one another, wherein the first cutter blades and the second cutter blades define a matrix of parallelepiped cells within the frame, and
    a mounting plate fixedly mounted medially of a plurality of the first cutter blades and the second cutter blades within the frame, with the mounting plate oriented substantially coplanar with the upper periphery, and a support shaft secured relative to the mounting plate, with the support shaft having a support shaft first end positioned in adjacency to the mounting plate, and a support shaft second end spaced from the frame, wherein the second end includes a handle portion,
    the mounting plate includes a head fixedly mounted to the mounting plate, and the head includes a cover receiving the head in an interlocking engagement, with the cover including the support shaft first end fixedly mounted to the cover, and a plunger rod slidably directed through the handle portion and the support shaft, with the cover including a cover bore, and the plunger rod having a plunger rod lowermost end received through the cover bore, and the head including a first receiving bore arranged for receiving the lowermost end, and a plurality of second receiving bores oriented obliquely relative to the first receiving bore to selectively receive the lower most end.

2. An earth clod chopper as set forth in claim 1 wherein the first cutter blades and the second cutter blades include respective sawtooth first blade edges and sawtooth second blade edges extending to the lower periphery, and the lower periphery configured as a continuous sawtooth blade periphery.

3. An earth clod chopper as set forth in claim 2 including an abutment plate fixedly mounted within the support shaft slidably receiving the plunger rod therethrough, and a spring member having a spring member first end fixedly mounted to the plunger rod in adjacency to the abutment plate, and a spring member second end arranged in engagement with the cover, and the spring member captured between the abutment plate and the cover to bias the lower distal end through the cover bore.

* * * * *